(12) United States Patent
Wu et al.

(10) Patent No.: US 11,218,340 B2
(45) Date of Patent: Jan. 4, 2022

(54) TRANSMISSION RANK AND PRECODER SIGNALING IN UPLINK NON-CODEBOOK BASED TRANSMISSION

(71) Applicant: QUALCOMM Incorporated, San Diego, CA (US)

(72) Inventors: Liangming Wu, Beijing (CN); Yu Zhang, Beijing (CN); Chenxi Hao, Beijing (CN); Hao Xu, Beijing (CN); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/636,531

(22) PCT Filed: Aug. 10, 2018

(86) PCT No.: PCT/CN2018/099945
§ 371 (c)(1),
(2) Date: Feb. 4, 2020

(87) PCT Pub. No.: WO2019/029697
PCT Pub. Date: Feb. 14, 2019

(65) Prior Publication Data
US 2021/0160104 A1    May 27, 2021

(30) Foreign Application Priority Data
Aug. 11, 2017  (WO) ................ PCT/CN2017/097103

(51) Int. Cl.
*H04L 25/02*    (2006.01)
*H04L 5/00*    (2006.01)
(Continued)

(52) U.S. Cl.
CPC ....... *H04L 25/0226* (2013.01); *H04B 7/0486* (2013.01); *H04L 5/0048* (2013.01);
(Continued)

(58) Field of Classification Search
CPC . H04L 25/0226; H04L 5/0048; H04B 7/0486; H04W 72/0413; H04W 72/0446; H04W 72/0453
See application file for complete search history.

(56) References Cited

U.S. PATENT DOCUMENTS

| 2015/0264700 A1 | 9/2015 | Li et al. |
| 2016/0100383 A1 | 4/2016 | Simonsson et al. |

(Continued)

FOREIGN PATENT DOCUMENTS

| CN | 102083223 A | 6/2011 |
| CN | 102932114 A | 2/2013 |

(Continued)

OTHER PUBLICATIONS

3GPP TR 38.912 V1.0.0, 3rd Generation Partnership Project; Technical Specification Group Radio Access Network; Study on New Radio (NR) Access Technology, (Release 14), Mar. 2017, pp. 1-74.

(Continued)

*Primary Examiner* — Brian D Nguyen
(74) *Attorney, Agent, or Firm* — QUALCOMM Incorporated

(57) ABSTRACT

Techniques and apparatus for configuring transmission rank and/or precoder(s) to support uplink non-codebook based transmission are provided. One technique includes receiving sounding reference signal (SRS) resource(s) from a user equipment (UE), where each SRS resource is associated with one or more precoded ports. At least one of a transmission rank or a set of precoders is determined based on the SRS resource(s). An indication of at least one of the SRS resource(s) is signaled to the UE. The UE uses the indication of the at least one of the SRS resource(s) to send an uplink transmission.

41 Claims, 13 Drawing Sheets

(51) Int. Cl.
*H04B 7/0456* (2017.01)
*H04W 72/04* (2009.01)

(52) U.S. Cl.
CPC ... *H04W 72/0413* (2013.01); *H04W 72/0446* (2013.01); *H04W 72/0453* (2013.01)

(56) References Cited

U.S. PATENT DOCUMENTS

| | | | | |
|---|---|---|---|---|
| 2018/0287682 | A1* | 10/2018 | Kwak | H04L 5/0057 |
| 2019/0173607 | A1* | 6/2019 | Liu | H04L 5/0044 |
| 2019/0181934 | A1* | 6/2019 | Kang | H04B 7/0404 |
| 2020/0083998 | A1* | 3/2020 | Chen | H04W 72/0413 |
| 2020/0099422 | A1* | 3/2020 | Osawa | H04B 7/0456 |
| 2020/0195330 | A1* | 6/2020 | Huang | H04W 72/042 |
| 2020/0358509 | A1* | 11/2020 | Wernersson | H04B 7/0632 |

FOREIGN PATENT DOCUMENTS

| | | |
|---|---|---|
| CN | 108111283 A | 6/2018 |
| WO | 2012092720 A1 | 7/2012 |

OTHER PUBLICATIONS

International Search Report and Written Opinion—PCT/CN2017/097103—ISA/EPO—dated May 11, 2018.
International Search Report and Written Opinion—PCT/CN2018/099495—ISA/EPO—dated Oct. 15, 2018.
Ericsson: "UL MIMO Procedures for Non-Codebook Based Transmission", 3GPP Draft, 3GPP TSG-RAN WG1 #89ah•NR, R1-1711009, UL MIMO Procedures for Non-Codebook Based Transmission, 3rd Generation Partnership Project (3GPP), Mobile Competence Centre, 650, Route Des Lucioles, F-06921 Sophia-Antipolis, vol. RAN WG1, No. Qingdao, China, Jun. 27, 2017-Jun. 30, 2017, Jun. 26, 2017 (Jun. 26, 2017), XP051300209, 3 Pages, Retrieved from the Internet: URL: http://www.3gpp.org/ftp/Meetings_3GPP_SYNC/RAN1/Docs/. [retrieved on Jun. 26, 2017] figure 1 section: 2; p. 2.
Huawei, et al, "Non-Codebook Based Transmission for UL MIMO", 3GPP Draft; 3GPP TSG RAN WG1 Meeting #89, R1-1706923, 3rd Generation Partnership Project (3GPP), Mobile Competence Centre; 650, Route Des Lucioles; F-06921 Sophia-Antipolis Cedex; France, vol. RAN WG1, No. Hangzhou, China; May 15, 2017-May 19, 2017, May 6, 2017 (May 6, 2017), XP051261580, pp. 1-6, Retrieved from the Internet: URL: http://www.3gpp.org/ftp/tsg_ran/WG1_RL1/TSGR1_89/Docs/, [retrieved on May 6, 2017].
LG Electronics: "Discussion on Non-Codebook Based Transmission for UL", 3GPP Draft, 3GPP TSG RAN WG1 NR Ad-Hoc#2, R1-1710277, UL Non-CB Final, 3rd Generation Partnership Project (3GPP), Mobile Competence Centre, 650, Route Des Lucioles, F-06921 Sophia-Antipolis Cedex, France, vol. RAN WG1, No. Qingdao, P.R. China, Jun. 27, 2017-Jun. 30, 2017, Jun. 26, 2017 (Jun. 26, 2017), XP051299493, 4 Pages, Retrieved from the Internet: URL: http://www.3gpp.org/ftp/Meetings_3GPP_SYNC/RAN1/Docs/. [retrieved on Jun. 26, 2017] figure 1 sections: 1,2; p. 1-p. 4.
Supplementary European Search Report—EP18845072—Search Authority—Munich—dated Mar. 16, 2021.
ZTE: "Codebook Based UL Transmission", 3GPP Draft, 3GPP TSG RAN WG1 Meeting #89, R1-1707113, Codebook Based UL Transmission, 3rd Generation Partnership Project (3GPP), Mobile Competence Centre, 650, Route Des Lucioles, F-06921 Sophia-Antipolis Cedex, France, vol. RAN WG1, No. Hangzhou, May 15, 2017-May 19, 2017, May 14, 2017 (May 14, 2017), XP051272339, 5 Pages, Retrieved from the Internet: URL: http://www.3gpp.org/ftp/Meetings_3GPP_SYNC/RAN1/Docs/. [retrieved on May 14, 2017] the whole document.

\* cited by examiner

|       | TRI=0 | TRI=1 | TRI=2 | TRI=3   |
|-------|-------|-------|-------|---------|
| SRI=0 | 0     | 0,1   | 0,1,2 | 0,1,2,3 |
| SRI=1 | 1     | 1,2   | 0,1,3 |         |
| SRI=2 | 2     | 0,3   | 0,1,4 |         |
| SRI=3 | 3     | 1,3   | 1,2,3 |         |

FIG. 8

|  | TRI=0 | TRI=1 | TRI=2 | TRI=3 |
|---|---|---|---|---|
| SRI=0 | 0 | 0,1 | 0,1,2 | 0,1,2,3 |
| SRI=1 | 0 | 1,2 | | |

FIG. 9

| Index | 0 | 1 | 2 | 3 | 4 | 5 | 6 | 7 |
|-------|---|---|---|---|---|---|---|---|
| TRI   | 0 | 0 | 0 | 0 | 1 | 1 | 2 | 3 |
| SRI   | 0 | 1 | 2 | 3 | 0 | 1 | 0 | 0 |

TRANSMISSION RANK AND PRECODER SIGNALING IN UPLINK NON-CODEBOOK BASED TRANSMISSION

CROSS-REFERENCE TO RELATED APPLICATION & PRIORITY CLAIM

This application for Patent is a national stage application under 35 U.S.C. 371 of PCT/CN2018/099945, filed Aug. 10, 2018, which claims the benefit of International Patent Cooperation Treaty Application No. PCT/CN2017/097103, filed Aug. 11, 2017, which are both assigned to the assignee hereof and hereby expressly incorporated by reference herein as if fully set forth below and for all applicable purposes.

TECHNICAL FIELD

Aspects of the present disclosure relate generally to wireless communications systems, and more particularly, to techniques for signaling a transmission rank and/or precoder(s) for an uplink non-codebook based transmission.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an e NodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure generally relate to methods and apparatus for configuring uplink non-codebook based transmissions, for example, by signaling a transmission rank indication (TRI) and/or a sounding reference signal (SRS) resource indication (SRI) for uplink non-codebook based transmissions.

Certain aspects of the present disclosure provide a method for wireless communication that may be performed, for example, by a base station (BS). The method generally includes receiving one or more sounding reference signal (SRS) resources from a user equipment (UE). Each SRS resource is associated with one or more precoded SRS ports. The method also includes determining, based on the one or more SRS resources, at least one of a transmission rank or a set of precoders for an uplink transmission. The method further includes signaling an indication of at least one of the one or more SRS resources to the UE.

Certain aspects of the present disclosure provide an apparatus for wireless communication. The apparatus generally includes means for receiving one or more sounding reference signal (SRS) resources from a user equipment (UE). Each SRS resource is associated with one or more precoded SRS ports. The apparatus also includes means for determining, based on the one or more SRS resources, at least one of a transmission rank or a set of precoders for an uplink transmission. The apparatus further includes means for signaling an indication of at least one of the one or more SRS resources to the UE.

Certain aspects of the present disclosure provide an apparatus for wireless communication. The apparatus generally includes a receiver, at least one processor, a transmitter, and a memory coupled to the at least one processor. The receiver is configured to receive one or more sounding reference signal (SRS) resources from a user equipment (UE), wherein each SRS resource is associated with one or more precoded SRS ports. The at least one processor is configured to determine, based on the one or more SRS resources, at least one of a transmission rank or a set of precoders for an uplink transmission. The transmitter is configured to transmit an indication of at least one of the one or more SRS resources to the UE.

Certain aspects of the present disclosure provide a computer-readable medium having computer executable code stored thereon for wireless communication by a UE. The computer executable code includes code for receiving one or more sounding reference signal (SRS) resources from a user equipment (UE). Each SRS resource is associated with one or more precoded SRS ports. The computer executable code also includes code for determining, based on the one or more SRS resources, at least one of a transmission rank or a set of precoders for an uplink transmission. The computer executable code further includes code for signaling an indication of at least one of the one or more SRS resources to the UE.

Certain aspects of the present disclosure provide a method for wireless communication that may be performed, for example, by a user equipment (UE). The method generally includes transmitting one or more sounding reference signal (SRS) resources to a base station, wherein each SRS resource is associated with one or more precoded SRS ports. The method also includes after transmitting the one or more SRS resources, receiving at least one of the one or more of the SRS resources to use for an uplink transmission. The method further includes determining a set of precoders for the uplink transmission based on the indication of the at least one of the one or more SRS resources. The method further includes sending an uplink transmission based in part on the set of precoders.

Certain aspects of the present disclosure provide an apparatus for wireless communication. The apparatus generally includes means for transmitting one or more sounding reference signal (SRS) resources to a base station. Each SRS resource is associated with one or more precoded SRS ports. The apparatus also includes means for receiving at least one of the one or more of the SRS resources to use for an uplink transmission after transmitting the one or more SRS resources. The apparatus further includes means for determining a set of precoders for the uplink transmission based on the indication of the at least one of the one or more SRS resources. The apparatus further includes means for sending an uplink transmission based in part on the set of precoders.

Certain aspects of the present disclosure provide an apparatus for wireless communication. The apparatus generally includes a receiver, at least one processor, a transmitter, and a memory coupled to the at least one processor. The transmitter is configured to transmit one or more sounding reference signal (SRS) resources to a base station. Each SRS resource is associated with one or more precoded SRS ports. The receiver is configured to receive at least one of the one or more of the SRS resources to use for an uplink transmission after transmitting the one or more SRS resources. The at least one processor is configured to determine a set of precoders for the uplink transmission based on the indication of the at least one of the one or more SRS resources. The transmitter is further configured to send an uplink transmission based in part on the set of precoders.

Certain aspects of the present disclosure provide a computer-readable medium having computer executable code stored thereon for wireless communication by a UE. The computer executable code includes code for transmitting one or more sounding reference signal (SRS) resources to a base station. Each SRS resource is associated with one or more precoded SRS ports. The computer executable code also includes code for receiving at least one of the one or more of the SRS resources to use for an uplink transmission after transmitting the one or more SRS resources. The computer executable code further includes code for determining a set of precoders for the uplink transmission based on the indication of the at least one of the one or more SRS resources. The computer executable code further includes code for sending an uplink transmission based in part on the set of precoders.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 8 shows an example mapping of transmission rank indication (TRI) to sounding reference signal (SRS) resource indication (SRI) selection, in accordance with certain aspects of the present disclosure.

FIG. 9 shows an example mapping table for port selection, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
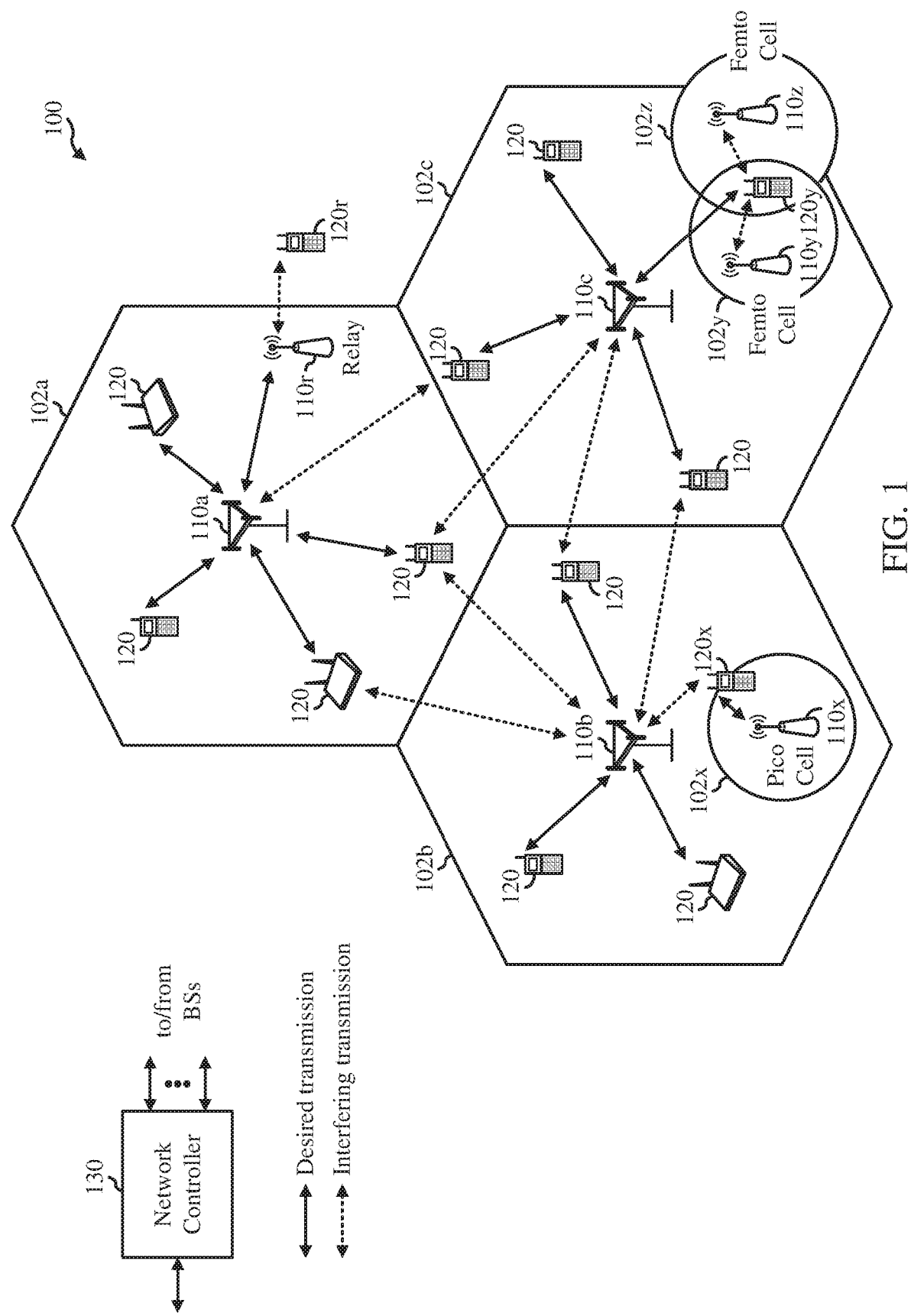
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology).

In certain systems (e.g., LTE) that support uplink MIMO, uplink transmissions may use an uplink codebook based design. Uplink codebook based designs, however, may be associated with increased computation complexity and large signaling overhead for devices. For example, in an uplink codebook based design, the base station may have to measure several (e.g., all) of the uplink antenna ports for calculation of the uplink codebook. Moreover, the base station may have to signal the UE the selected PMI for the uplink transmission (e.g., UL MIMO transmission) in the uplink grant (e.g., DCI), which may incur a large signaling overhead.

To reduce the amount of computation complexity and/or signaling overhead associated with uplink codebook based designs, certain systems (e.g., NR) that support UL MIMO may use an uplink non-codebook based design. Compared to a codebook-based transmission scheme, a non-codebook based transmission scheme may enable an uplink transmission (e.g., for UL MIMO) from a UE without including an indication of the precoder in the UL grant. Accordingly, it may desirable to provide techniques that enable the UE to determine the precoding and/or rank to use for an uplink transmission in systems that support non-codebook based uplink transmission.

Aspects presented herein provide techniques and apparatus for various signaling of transmission rank indication (TRI) and/or SRS resource indication (SRI) to support uplink non-codebook based transmissions. As described in more detail below, a base station may receive one or more SRS resources from a UE, and each SRS resource may include one or more precoded SRS ports (e.g., beamformed SRS). The base station may determine, based on the SRS resource(s), at least one of a TRI or SRI, and feedback the TRI and/or SRI to the UE to configure the selected rank/beam for an uplink (e.g., PUSCH) transmission from the UE.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA). Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE. LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

NR access (e.g., 5G technology) may support various wireless communication services, such as Enhanced mobile broadband (eMBB) targeting wide bandwidth (e.g. 80 MHz beyond), millimeter wave (mmW) targeting high carrier frequency (e.g. 60 GHz), massive machine type communications (MTC) (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe.

NR introduces the concept of network slicing. For example, a network may have multiple slices, which may support different services, for example, internet of everything (IoE), URLLC, eMBB, vehicle-to-vehicle (V2V) communications, etc. A slice may be defined as a complete logical network that comprises of a set of network functions and corresponding resources necessary to provide certain network capabilities and network characteristics.

Example Wireless Communications System

FIG. 1 illustrates an example wireless communication network 100, such as a new radio (NR) or 5G network, in which aspects of the present disclosure may be performed, e.g., for configuring uplink non-codebook based transmissions. For example, in some aspects, the BS 110 may receive one or more SRS resources from a UE 120. Each SRS resource may include one or more precoded SRS ports (e.g., beamformed SRS). BS 110 may determine, based on the SRS resources, at least one of a transmission rank indication (TRI) or SRS resource indication (SRI), and feedback the TRI and/or SRI to UE 120 to configure the selected rank/beam for a PUSCH transmission from UE 120.

As illustrated in FIG. 1, the wireless communication network 100 may include a number of BSs 110 and other network entities. A BS may be a station that communicates with UEs. Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless communication network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG). UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types. e.g., macro BS, pico BS, femto BS, relays, etc. These different types of BSs may have different transmit power levels, different coverage areas, and different impact on interference in the wireless communication network 100. For example, a macro BS may have a high transmit power level (e.g., 20 Watts) whereas pico BS, femto BS, and relays may have a lower transmit power level (e.g., Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, asmart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transform (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. In some examples, a UE may function as a scheduling entity and may schedule resources for one or more subordinate entities (e.g., one or more other UEs). The other UE(s) may utilize resources scheduled by the UE for wireless communication. In some examples, a UE may function as a scheduling entity in a peer-to-peer (P2P) network, and/or in a mesh network. In a mesh network example, UEs may communicate directly with one another in addition to communicating with the scheduling entity.

Figure 2:
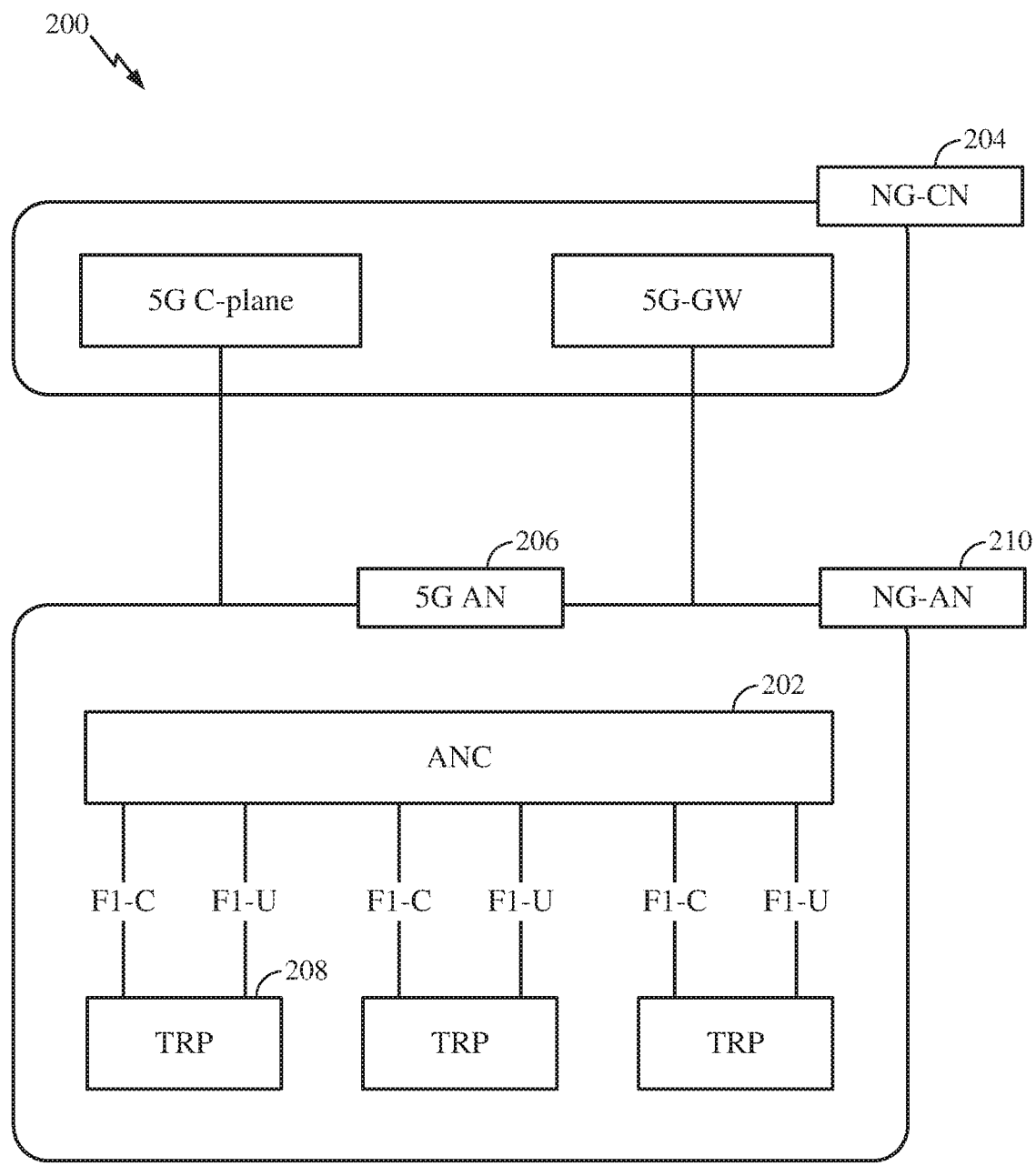
FIG. 2 is a block diagram illustrating an example logical architecture of a distributed radio access network (RAN), in accordance with certain aspects of the present disclosure.

FIG. 2 illustrates an example logical architecture of a distributed radio access network (RAN) 200, which may be implemented in the wireless communication network illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring Next Generation Access Nodes (NG-ANs) 210 may terminate at ANC 202. ANC 202 may include one or more TRPs 208 (which may also be referred to as BSs. NR BSs, Node Bs, 5G NBs. APs, or some other term). As described above, a TRP may be used interchangeably with "cell."

The TRP(s) 208 may be a distributed unit (DU). TRP(s) 208 may be connected to a single ANC (e.g., ANC 202) or more than one ANC (not illustrated). For example, for RAN sharing, radio as a service (RaaS), and service specific AND deployments. TRP(s) 208 may be connected to more than one ANC. TRP(s) 208 may each include one or more antenna ports. TRP(s) 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example. Next Generation Access Node (NG-AN) 210 may support dual connectivity with NR, and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer. Radio Link Control (RLC) layer, Medium Access Control (MAC) layer, and a Physical (PHY) layers may be adaptably placed at the DU (e.g., TRP 208) or CU (e.g., ANC 202). A BS may include a CU and/or one or more DUs.

Figure 3:
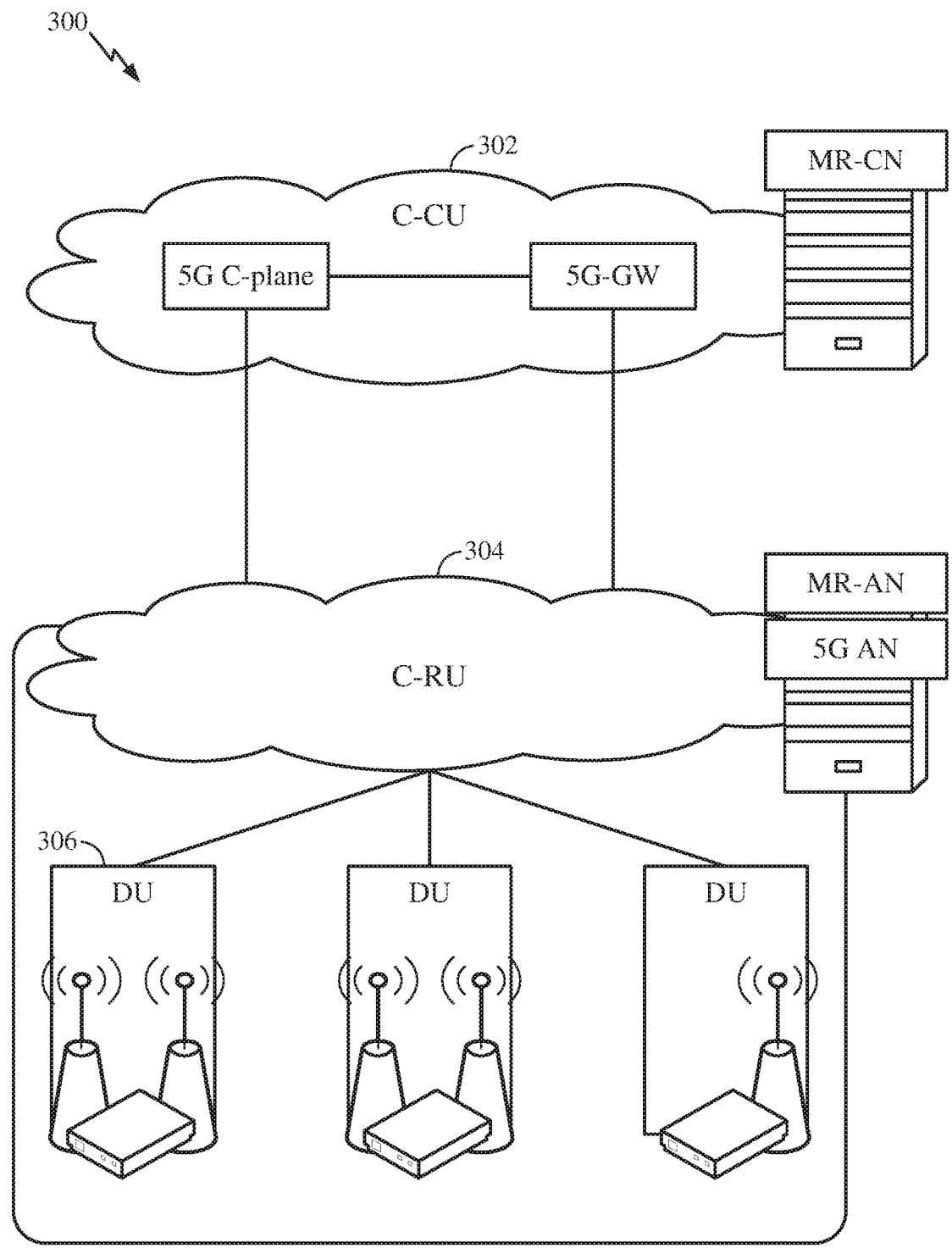
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, C-RU 304 may host core network functions locally. C-RU 304 may have distributed deployment. C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
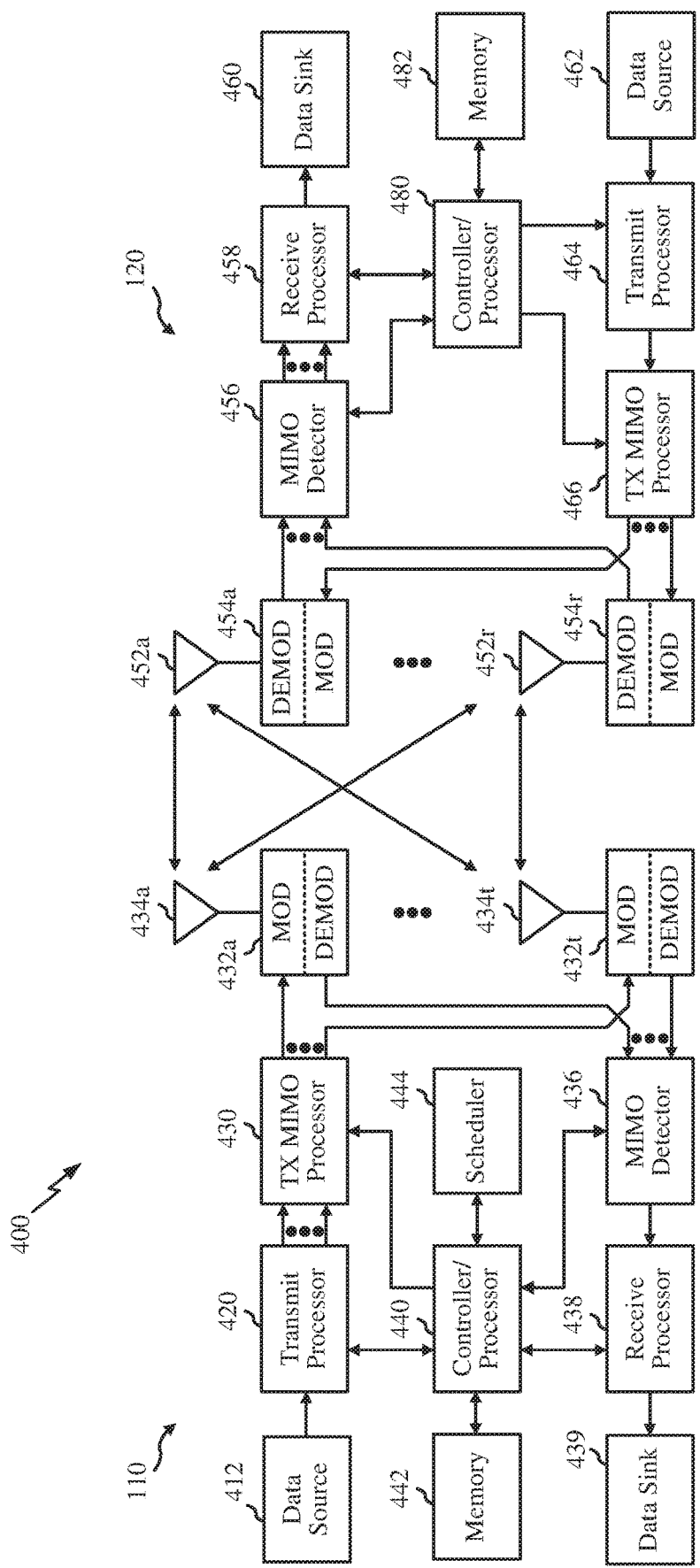
FIG. 4 is a block diagram conceptually illustrating a design of an example base station (BS) and user equipment (UE), in accordance with certain aspects of the present disclosure.

FIG. 4 illustrates example components of the BS 110 and UE 120 (as depicted in FIG. 1), which may be used to implement aspects of the present disclosure. As noted above, the BS may include a TRP. For example, antennas 452, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 7-12, and/or other various techniques and methods described herein.

At the BS 110, a transmit processor 420 may receive data from a data source 412 and control information from a controller/processor 440. The control information may be for the Physical Broadcast Channel (PBCH), Physical Control Format Indicator Channel (PCFICH). Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols. e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal (e.g., sounding reference signal (SRS)). The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 480 and/or other processors and modules at the UE 120 may also perform or direct, e.g., the execution of the functional blocks illustrated in FIG. 8 and/or other processes for the techniques described herein. The processor 440 and/or other processors and modules at the BS 110 may also perform or direct, e.g., the execution of the functional blocks illustrated in FIG. 7 and/or other processes for the techniques described herein. The memories 442 and 482 may store data and program codes for the BS 110 and the UE 120, respectively. A scheduler 444 may schedule UEs for data transmission on the downlink and/or uplink.

Figure 5:
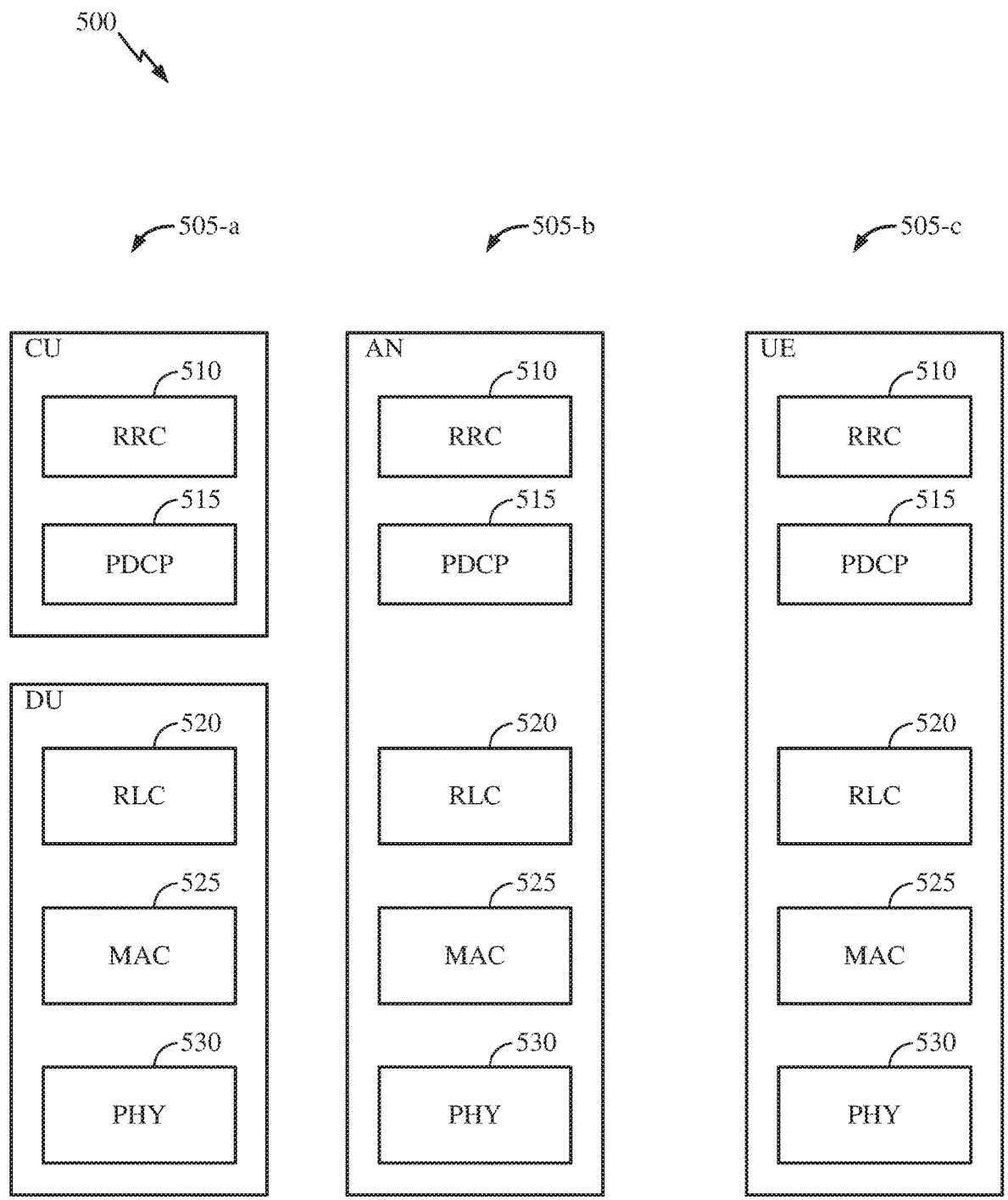
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples, the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option. RRC layer 510, PDCP layer 515. RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 12, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
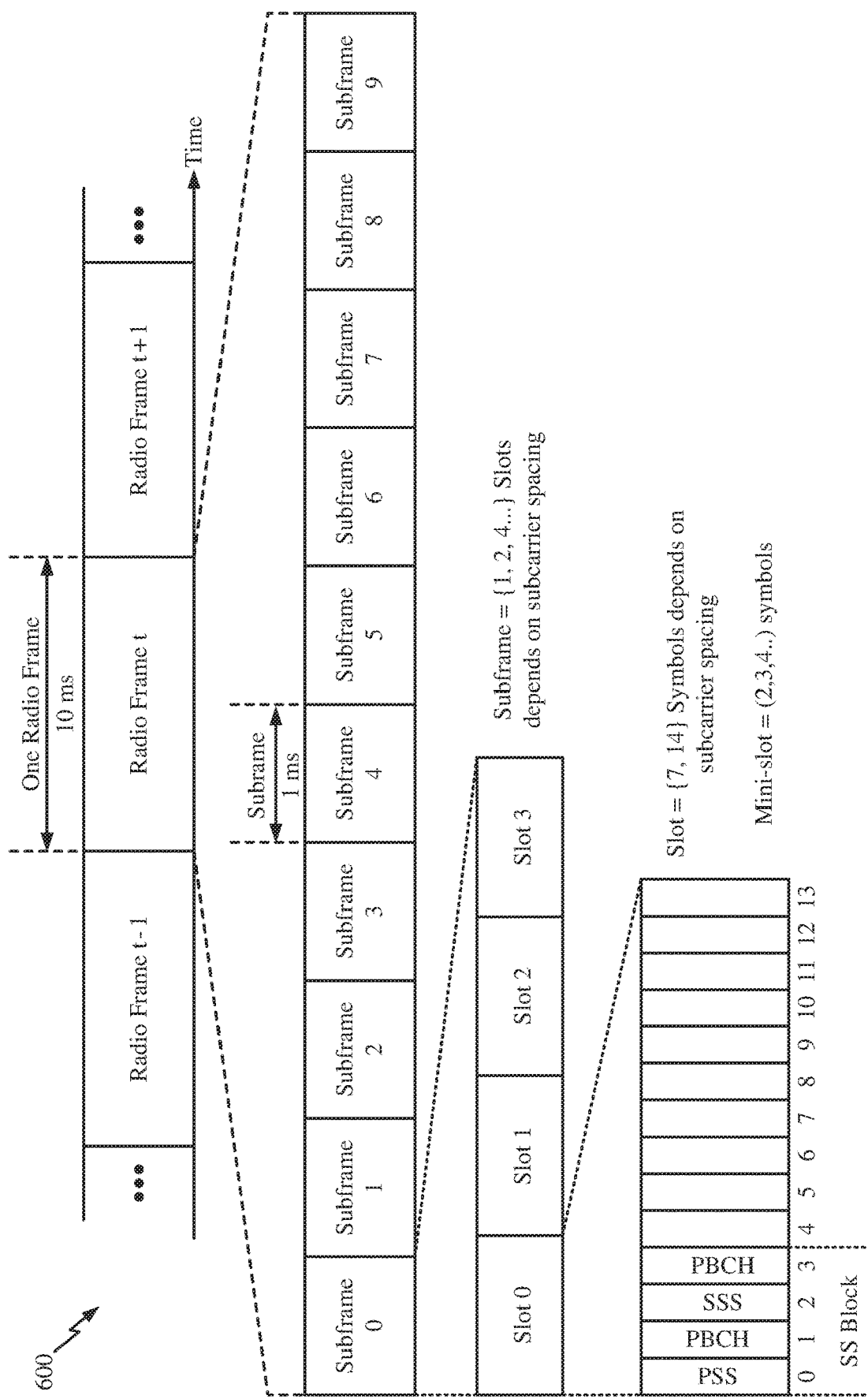
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subearrier spacing. Each slot may include a variable number of symbol periods (e.g., 7 or 14 symbols) depending on the subcarrier spacing. The symbol periods in each slot may be assigned indices. A mini-slot is a subslot structure (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DUUL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet-of-Everything (IoE) communications. IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs. or to initiate a change of serving cell for one or more of the UEs.

In wireless communications, channel state information (CSI) may refers to known channel properties of a communication link. The CSI may represent the combined effects of, for example, scattering, fading, and power decay with distance between a transmitter and receiver. Channel estimation may be performed to determine these effects on the channel. CSI may be used to adapt transmissions based on the current channel conditions, which is useful for achieving reliable communication, in particular, with high data rates in multi-antenna systems. CSI is typically estimated at the receiver, quantized, and fed back to the transmitter.

In certain systems (e.g., Release 13 long term evolution (LTE)). CSI feedback is based on a pre-defined codebook. This may be referred to as implicit CSI feedback. Precoding may be used for beamforming in multi-antenna systems. Codebook based precoding uses a common codebook at the transmitter and receiver. The codebook includes a set of vectors and matrices. The UE calculates a precoder targeting maximum single-user (SU) multiple input multiple output (MIMO) spectrum efficiency. The implicit CSI feedback include a rank indicator (RI), a precoding matrix indicator (PMI), and associated channel quality indicator (CQI) based on the PMI. The PMI includes a W1 precoding matrix and a W2 precoding matrix.

Example Transmission Rank and Precoder
Signaling in Uplink Non-Codebook Based
Transmission In certain systems (e.g., such as LTE), UL MIMO is generally achieved with precoder feedback, and thus is based on an uplink codebook based design. As noted however, uplink codebook based designs may be associated with increased computational complexity (of the uplink codebook) and increased signaling overhead (of the selected precoder). For example, in uplink codebook based designs (or transmission schemes), the BS may have to measure all of the uplink antenna ports for calculation of the uplink codebook, thereby increasing the complexity of the uplink codebook calculation. Additionally, in uplink codebook based designs, the BS typically signals the selected precoder (e.g., transmitted precoding matrix indicator (TPMI)) for the UL MIMO transmission in the uplink grant (e.g., DCI). However, signaling the selected precoder in this manner can substantially increase the uplink grant signaling overhead.

Compared to LTE, certain systems, such as NR that support UL-MIMO (e.g., NR-MIMO) may support an uplink non-codebook based transmission as one type of uplink transmission scheme. Supporting an uplink non-codebook based transmission scheme may refer to supporting an uplink transmission (e.g., from the UE) without including a transmitted precoding matrix indicator (TPMI) in the uplink grant.

Uplink non-codebook based transmission schemes may be associated with reduced computational complexity (of the uplink codebook) and/or reduced signaling overhead, compared to, e.g., uplink codebook based transmission schemes. For example, in uplink non-codebook based transmission schemes, the UE may be configured with multiple SRS resources (e.g., for sending SRS), and each SRS resource may include one or more SRS ports. The UE may determine a candidate set of uplink transmit beams (e.g., precoders) based on measurement of downlink reference signals (e.g., channel state information reference signals (CSI-RSs), etc.) from the BS and channel reciprocity. The UE may use the determined uplink precoder(s) to precode the SRS ports in each SRS resource and transmit the SRS resources to the BS. Upon receiving the SRS resources, the BS can measure the multiple precoded SRS ports, and configure the precoder for the UL MIMO (e.g., PUSCH) transmission by choosing one or more of the precoded SRS ports.

By allowing the BS to determine a precoder by choosing from among the precoded SRS ports, e.g., as opposed to calculating the uplink codebook and signaling the precoder to the UE, uplink non-codebook based transmission schemes can significantly simply the computational complexity and signaling overhead associated with uplink codebook based transmission schemes. However, as noted, in uplink non-codebook based transmission schemes, the BS generally does not send TPMI in the uplink grant to indicate the preferred precoder. Thus, it may be desirable to provide techniques that allow the BS to efficiently indicate the PUSCH precoder determination for an uplink transmission.

Aspects presented herein provide various techniques that enable the BS to configure the rank and/or selected precoder for an UL MIMO transmission, e.g., without including a TPMI in the uplink grant. More specifically, aspects presented herein provide techniques for design of signaling that can be used to indicate at least one of rank or precoder in DCI for uplink non-codebook based transmissions. In certain aspects, various types and/or combinations of signaling (e.g., in a non-codebook based transmission scheme) may be used to indicate the precoder determination for an uplink transmission. For example, as described in more detail below, an uplink non-codebook based transmission scheme may support at least one of the following: (1) signaling of SRI(s) only, without a TPMI in the uplink grant; (2) signaling of TRI only, without a TPMI in the uplink grant; (3) signaling of TRI and a single SRI, without a TPMI in the uplink grant; and/or (4) signaling of a single TRI and a single SRI, without a TPMI in the uplink grant. The signaling options that are supported for a given UE may be based in part on the UE's capability in terms of calibration.

Figure 7:
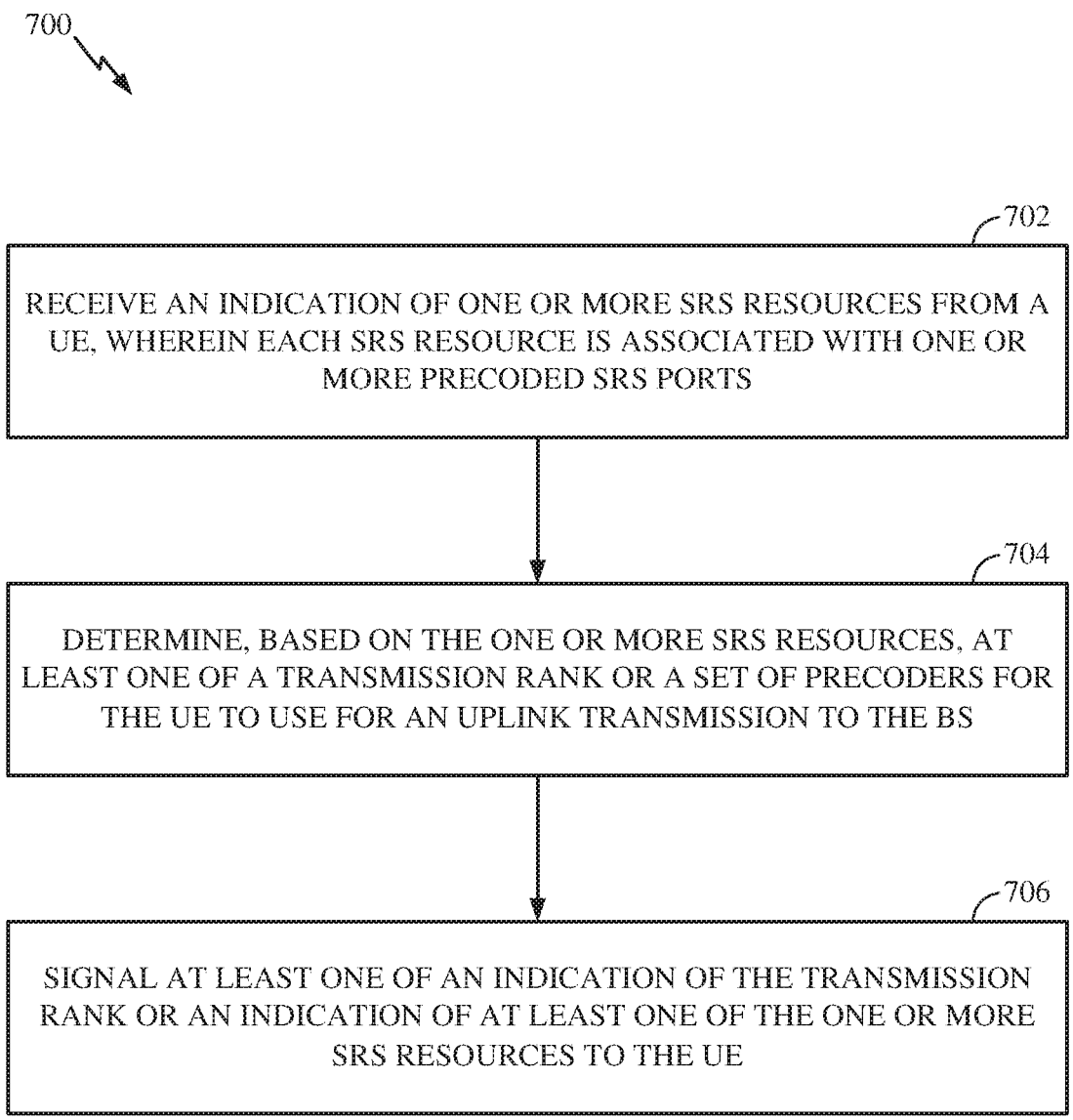
FIG. 7 is a flow diagram illustrating example operations that may be performed by a BS, for signaling at least one of a transmission rank or precoder(s) for an uplink non-codebook based transmission.

FIG. 7 is a flow diagram illustrating example operations 700 that may be performed, for example, by a BS (e.g., BS 110), for configuring at least one of a transmission rank or precoder(s) for an uplink non-codebook based transmission, in accordance with certain aspects of the present disclosure. Operations 700 may begin, at 702, where the BS receives an indication of one or more SRS resources from a UE (e.g., UE 120). Each SRS resource is associated with one or more precoded SRS ports. At 704, the BS determines, based on the SRS resources, at least one of a transmission rank or a set of precoders for the UE to use for an uplink transmission to the BS. At 706, the BS signals at least one of an indication of the transmission rank or an indication of one or more of the SRS resources to the UE. In some aspects, after signaling the indication(s), the BS may receive an uplink transmission (e.g., UL MIMO transmission) from the UE based in part on at least one of the transmission rank or the SRS resource(s).

In some aspects, the BS may configure the uplink non-codebook based transmission by signaling the indication of the transmission rank (e.g., TRI) only (e.g., without signaling SRI). The TRI may indicate the uplink transmission rank and the set of precoders for the UE to use for the uplink transmission (e.g., PUSCH). In some cases, the number of precoders in the set of precoders may be based on a size of the transmission rank. In one example, the number of precoders may be equal to a size of the transmission rank (e.g., one precoder for rank1, two precoders for rank2, etc.).

In cases where the BS receives a single SRS resource (including one or more SRS ports) from the UE (e.g., the UE may be configured with a single SRS resource), the TRI may indicate the uplink transmission rank and the set of precoders (selected from the precoding used for one or more of the precoded SRS ports) in the single SRS resource. The TRI to port mapping may be pre-defined or configurable via higher layer or semi-static signaling. In one reference example, assume the single SRS resource includes four ports. In this case, when TRI='0' (indicating a rank1 case), then the precoder for the $1^{st}$ port may be selected for PUSCH; when TRI='1' (indicating a rank2 case), then the precoder of the $1^{st}$ and $2^{nd}$ port may be selected for the $1^{st}$ and $2^{nd}$ layer, respectively; and so on. Note, however, that the above TRI values are provided as merely reference examples and that any value of TRI may be used to indicate a particular rank and/or a set of precoders.

In cases where the BS receives multiple SRS resources (each including one or more SRS ports) from the UE (e.g., the UE may be configured with multiple SRS resources), the TRI may indicate the uplink transmission rank and the set of precoders (selected from the precoding used for one or more of the precoded SRS ports) in the multiple SRS resources. The TRI to SRI mapping and the selected ports within the SRI may be pre-defined or configurable via high layer or semi-static signaling. In one reference example, assume there are four SRS resources, each including one or more ports. In this example, when TRI='0' (rank1), the $1^{st}$ port in the $1^{st}$ SRS resource may be selected; when TRI='1' (rank2), the $1^{st}$ and $2^{nd}$ port in the $2^{nd}$ SRS resource may be selected; and so on. Note, however, that the above TRI values are provided as merely reference examples and that any value of TRI may be used to indicate a particular rank and/or set of precoders.

In some aspects, the BS may configure the uplink non-codebook based transmission by signaling the indication of the SRS resource (e.g., SRI) only (e.g., without signaling TRI). The SRI may indicate the uplink transmission rank and the set of precoders for the UE to use for the uplink transmission (e.g., PUSCH).

In some aspects, the BS may configure the uplink transmission rank and the set of precoders via a wideband SRI field in the uplink grant (e.g., DCI). For example, in cases where the BS signals a single (e.g., wideband) SRI in the uplink grant (e.g., the uplink grant indicates a single SRS resource from one or more SRS resources), the wideband SRI may indicate the uplink transmission rank and the selected one of the received SRS resources. The uplink transmission rank may be equal to a number of ports in the selected SRS resource. The set of precoders may be selected from the selected SRS resource (e.g., the set of precoders may correspond to the precoder(s) used for the SRS port(s) in the selected SRS resource).

In cases where the BS signals multiple SRI in the uplink grant (e.g., the uplink grant indicates multiple SRS resources from the received SRS resources), one or more ports of the selected SRS resources may be used for the set of precoders. In this case, the uplink transmission rank may be equal to a summation of ports in the selected SRS resources. The layer to ports in the SRI may be one-to-one mapped. In one reference example, assume there are four SRS resources and that the number of ports in the SRS resources are (1), (2), (2), (1), respectively. In this example, if the selected SRI is $1^{st}$ and $3^{rd}$, then rank 3 with 1 precoder from the $1^{st}$ SRI and 2 precoders from the $3^{rd}$ SRI may be used for the PUSCH. The SRI(s) can be jointly encoded or bit-map like encoded. The feedback of multiple SRI may be wideband.

In some aspects, the BS may configure the uplink non-codebook based transmission by signaling the indication of the SRS resource (e.g., SRI) and the indication of the transmission rank (e.g., TRI). The TRI may indicate the uplink transmission rank and the set of precoders for the UE to use for the uplink transmission (e.g., PUSCH).

In cases where each SRS resource includes a single port (e.g., each SRS resource includes a single precoded SRS port), the TRI may indicate the uplink transmission rank and the SRI may indicate the selected SRS resource for each layer. The SRI may indicate one selected SRS resource or multiple selected SRS resources depending on the TRI. For example, a number of the indicated SRS resources may be equal to a size of the transmission rank (e.g., one SRS resource for rank1, two SRS resources for rank2, etc.). In this example, the set of precoders may include a single precoder from each of the indicated SRS resources. The SRI may be subband and the TRI may be wideband.

In some cases, the SRI can be indicated via a bit-map. For example, assume there are four SRS resources, each assigned with 1-bit to indicate whether it is selected. In this example, for TRI='1' (rank2), two SRS resources may be selected. In some cases, the SRI selection can be restricted based on TRI. For example, for four SRS resources, a maximum of four hypothesis for a given TRI may be selected to reduce the feedback overhead. The mapping of restricted TRI to SRI selection hypothesis can be configurable via higher layer signaling or semi-static signaling. FIG. 8 shows one reference example of a mapping of restricted TRI to SRI selection hypothesis, in accordance with certain aspects of the present disclosure. In particular, each column in FIG. 8 shows the allowed SRI combinations (that could be jointly selected) for each transmission rank.

In cases where the SRS resource includes multiple ports (e.g., multiple precoded SRS ports), the TRI may indicate the uplink transmission rank and the SRI may indicate the selected SRS resource. The ports selected with the selected SRS resource may be indicated by TRI and SRI. In this case, TRI may be fed back on the wideband, and SRI can be fed back on the wideband or subband. The port selection within the SRS resource may be based on a mapping table, which can be pre-configured via higher layer or semi-static signaling. FIG. 9 shows one reference example of a mapping table for port selection, in accordance with certain aspects of the present disclosure. In particular, FIG. 9 shows the selected port index within the selected SRS resource among two SRS resources, where SRS resource 1 (e.g., "SRS=0") includes 4 ports and SRS resource 2 (e.g., "SRS=1") includes two ports.

Figures 10A, 10B:
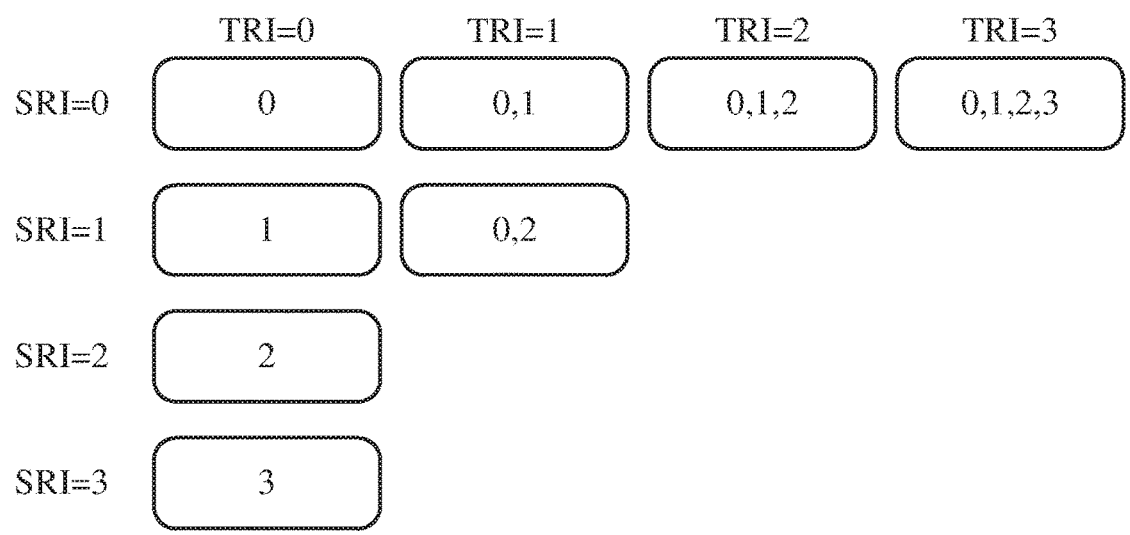
FIG. 10A illustrates an example bitmap table for mapping a feedback index to jointly encoded TRI/SRI, in accordance with certain aspects of the present disclosure.
FIG. 10B illustrates an example mapping of TRI to SRI selection for the mapping table in FIG. 10A, in accordance with certain aspects of the present disclosure.

In some aspects, the BS may jointly encode TRI and SRI (e.g., when signaling both TRI and SRI) to save DCI signaling overhead. In some cases, a bitmap table of feedback index to the TRI/SRI mapping can be used for the jointly encoded TRI/SRI. FIG. 10A illustrates an example bitmap table of feedback index to TRI/SRI mapping that can be used for the mapping table in FIG. 10B (which shows an example mapping of restricted TRI to SRI selection hypothesis), in accordance with certain aspects of the present disclosure.

Figure 11:
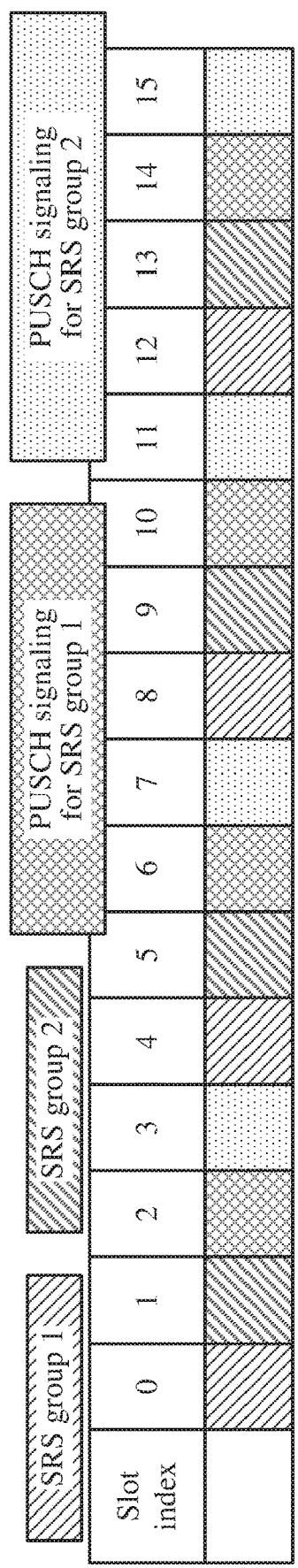
FIG. 11 illustrates an example of time and/or frequency dependent TRI/SRI signaling, in accordance with certain aspects of the present disclosure.

In some aspects, the signaling for TRI/SRI may be slot and/or frequency dependent. For example, different slots and/or frequency (e.g., multiple bandwidth parts) may carry different SRS resources, and the signaling can be based on the particular slots/frequency used for the different SRS resources. In one example, different signaling can be used for different slots. As shown in FIG. 11, for example, a first group of SRS resources (e.g., SRS group 1) may be transmitted on slot 0, 4, 8, 12 and the corresponding TRI/SRI may be fed back on slots 2, 6, 10 and 14. Similarly, as also shown in FIG. 11, a second group of SRS resources (e.g., SRS group 2) may be transmitted on slot 1, 5, 9 and 13 and the corresponding TRI/SRI may be fed back on slots 3, 7, 11 and 15.

In some aspects, the mapping table used in each of the signaling options (e.g., TRI only, SRI only, TRI and SRI) can be slot and/or frequency dependent. For example, the BS can configure different TRI/SRI to selected rank and precoder mapping for different slots or frequency, and the UE can use the corresponding table based on index of slot or frequency.

Figure 12:
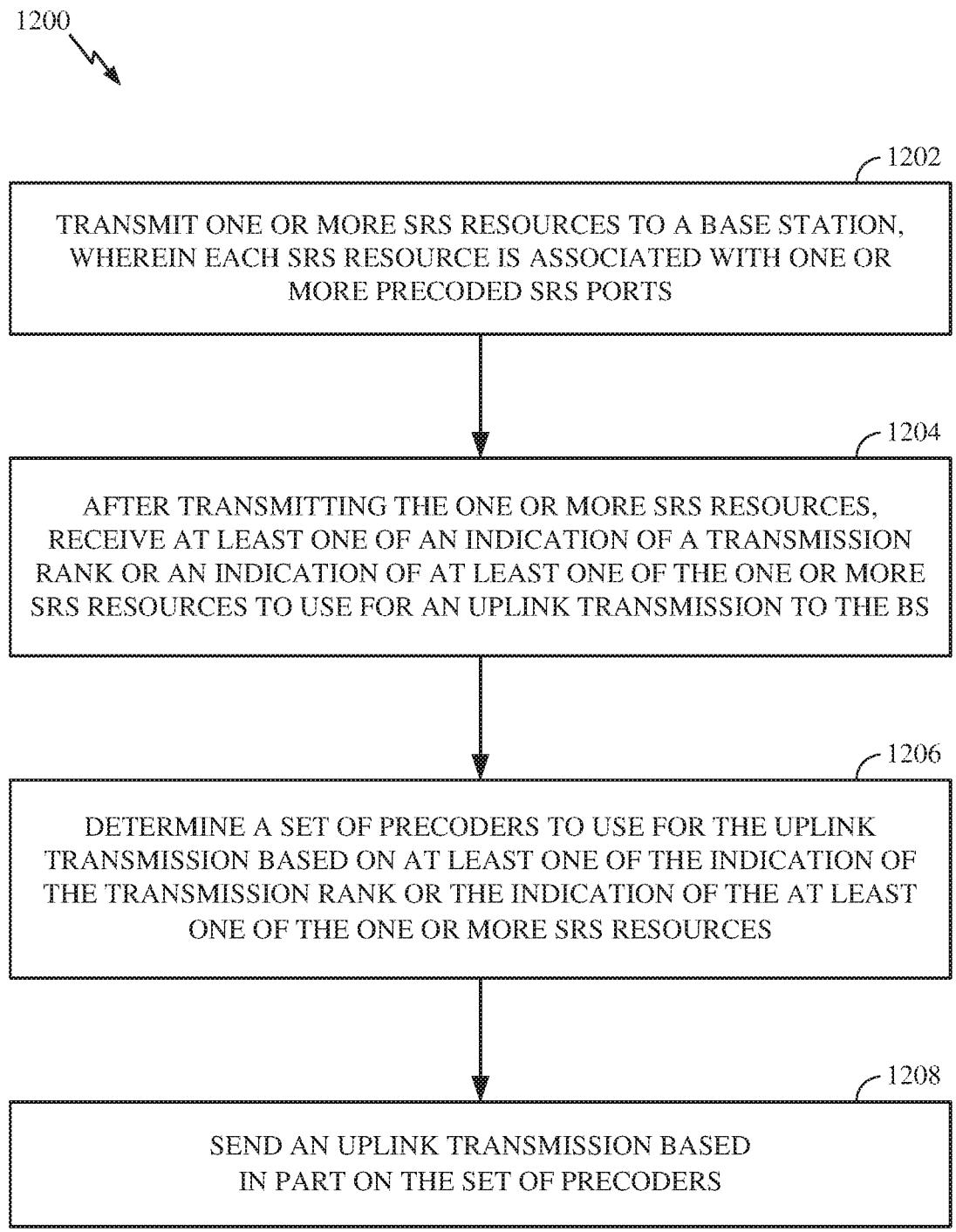
FIG. 12 is a flow diagram illustrating example operations that may be performed by a UE, for receiving signaling of at least one of a transmission rank or precoder(s) for an uplink non-codebook based transmission.

FIG. 12 is a flow diagram illustrating example operations 1200 that may be performed, for example, by a UE (e.g., UE 120), for determining at least one of a transmission rank or precoder(s) for an uplink non-codebook based transmission, in accordance with certain aspects of the present disclosure.

Operations 1200 may begin, at 1202, where the UE transmits one or more SRS resources to a base station (e.g., BS 110). Each SRS resource is associated with one or more precoded SRS ports. At 1204, the UE, after transmitting the one or more SRS resources, receives at least one of an indication of a transmission rank or an indication of one or more of the SRS resources to use for an uplink transmission to the BS. At 1206, the UE determines a set of precoders to use for the uplink transmission based on at least one of the indication of the transmission rank or the indication of the one or more SRS resources. At 1208, the UE sends an uplink transmission based in part on the set of precoders.

In certain aspects, the UE (e.g., in operations 1200) may determine a transmission rank based on the indication of the at least one of the one or more SRS resources (e.g., SRI), and send the uplink transmission further based on the transmission rank. In some aspects, the indication of the at least one of the one or more SRS resources may include an indication of a single SRS resource. In this aspect, the UE may determine the set of precoders and the transmission rank from the single SRS resource. For example, the transmission rank may be equal to a number of precoded SRS ports in the single SRS resource. In some aspects, the indication of the at least one of the one or more SRS resources may include an indication of a plurality of SRS resources. In this aspect, the UE may determine the set of precoders from the plurality of SRS resources. The UE may also determine the transmission rank from the plurality of SRS resources (e.g., the transmission rank may be equal to a number of precoded SRS ports in the plurality of SRS resources).

In some aspects, each of the one or more SRS resources may include a single precoded SRS port or multiple precoded SRS ports. The UE may transmit the one or more SRS resources to the BS on a first set of time and frequency resources, and receive the indication of the at least one of the one or more SRS resources on a second set of time and frequency resources.

Figure 13:
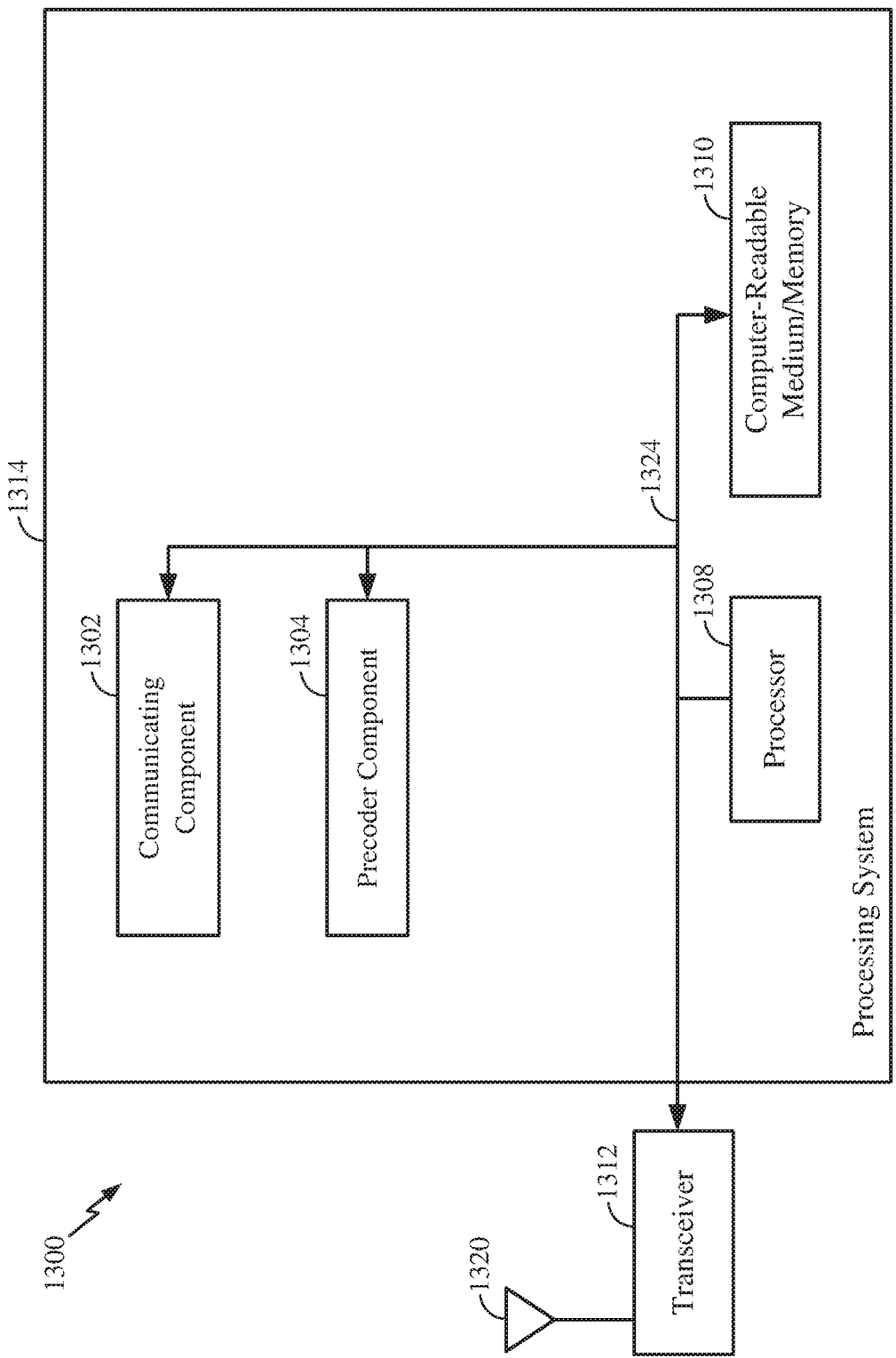
FIG. 13 illustrates a communications device that may include various components configured to perform operations for the techniques disclosed herein in accordance with aspects of the present disclosure.

FIG. 13 illustrates a communications device 1300 that may include various components (e.g., corresponding to means-plus-function components) configured to perform operations for the techniques disclosed herein, such as the operations illustrated in FIGS. 7 and 12. The communications device 1300 includes a processing system 1314 coupled to a transceiver 1312. The transceiver 1312 is configured to transmit and receive signals for the communications device 1300 via an antenna 1320, such as the various signals described herein. The processing system 1314 may be configured to perform processing functions for the communications device 1300, including processing signals received and/or to be transmitted by the communications device 1300.

The processing system 1314 includes a processor 1308 coupled to a computer-readable medium/memory 1310 via a bus 1324. In certain aspects, the computer-readable medium/memory 1310 is configured to store instructions that when executed by processor 1308, cause the processor 1308 to perform the operations illustrated in FIGS. 7, 12 or other operations for performing the various techniques discussed herein.

In certain aspects, the processing system 1314 further includes a communicating component 1302 for performing the operations illustrated at 702 and 706 in FIG. 7 and/or the operations illustrated at 1202, 1204, and 1208 in FIG. 12. Additionally, the processing system 1114 includes a precoder component 1304 for performing the operations illustrated at 704 in FIG. 7 and/or the operations illustrated at 1204 in FIG. 12. The communicating component 1302 and the precoder component 1304 may be coupled to the processor 1308 via bus 1324. In certain aspects, the communicating component 1302 and precoder component 1304 may be hardware circuits. In certain aspects, the communicating component 1302 and precoder component 1304 may be software components that are executed and run on processor 1308.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

In some cases, rather than actually communicating a frame, a device may have an interface to communicate a frame for transmission or reception. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting, means for signaling, means for indicating, means for configuring, means for sending, means for communicating, and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for identifying, means for determining, means for generating, means for precoding, means for adding, means for comparing, means for setting, means for selecting, means for choosing, means for configuring, means for signaling, means for initiating, means for triggering, means for performing and/or means for applying may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers. DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory. ROM (Read Only Memory), PROM (Programmable Read-Only Memory). EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a base station (BS), comprising:
   receiving one or more sounding reference signal (SRS) resources from a user equipment (UE), wherein each SRS resource is associated with one or more precoded SRS ports;
   determining, based on the one or more SRS resources, at least one of a transmission rank or a set of precoders for an uplink transmission; and
   signaling an indication of at least one SRS resource from the one or more SRS resources to the UE, wherein the indication of the at least one SRS resource indicates the set of precoders and the transmission rank.

2. The method of claim 1, wherein:
   the at least one SRS resource comprises a single SRS resource from the one or more SRS resources;
   the set of precoders are selected from the single SRS resource; and
   the transmission rank is equal to a number of precoded SRS ports in the single SRS resource.

3. The method of claim 1 wherein:
   the at least one SRS resource comprises a plurality of SRS resources from the one or more SRS resources;

the set of precoders are selected from the plurality of SRS resources; and the transmission rank is equal to a number of precoded SRS ports in the plurality of SRS resources.

4. The method of claim 1, wherein each of the one or more SRS resources comprises a single precoded SRS port.

5. The method of claim 1, further comprising:
receiving an uplink transmission that is based on at least one of the transmission rank or the set of precoders.

6. The method of claim 1, wherein:
the one or more SRS resources are received on a first set of time and frequency resources;
the indication of the at least one SRS resource is signaled on a second set of time and frequency resources; and
the second set of time and frequency resources are determined in part on the first set of time and frequency resources.

7. A method for wireless communication by a user equipment (UE), comprising:
transmitting one or more sounding reference signal (SRS) resources to a base station (BS), wherein each SRS resource is associated with one or more precoded SRS ports;
after transmitting the one or more SRS resources, receiving an indication of at least one SRS resource of the one or more SRS resources to use for an uplink transmission;
determining (i) a set of precoders for the uplink transmission and (ii) a transmission rank, based on the indication of the at least one SRS resource of the one or more SRS resources; and
sending an uplink transmission based in part on the set of precoders and the transmission rank.

8. The method of claim 7, wherein:
the at least one SRS resource comprises a single SRS resource;
the set of precoders are determined from the single SRS resource; and
the transmission rank is equal to a number of precoded SRS ports in the single SRS resource.

9. The method of claim 7, wherein:
the at least one SRS resource comprises a plurality of SRS resources;
the set of precoders are determined from the plurality of SRS resources; and
the transmission rank is equal to a number of precoded SRS ports in the plurality of SRS resources.

10. The method of claim 7, wherein each of the one or more SRS resources comprises a single precoded SRS port.

11. The method of claim 7, wherein:
the one or more SRS resources are transmitted to the BS on a first set of time and frequency resources;
the indication of the at least one SRS resource is received on a second set of time and frequency resources; and
the second set of time and frequency resources are determined in part on the first set of time and frequency resources.

12. An apparatus for wireless communications, comprising:
means for receiving one or more sounding reference signal (SRS) resources from a user equipment (UE), wherein each SRS resource is associated with one or more precoded SRS ports;
means for determining, based on the one or more SRS resources, at least one of a transmission rank or a set of precoders for an uplink transmission; and means for signaling an indication of at least one SRS resource from the one or more SRS resources to the UE, wherein the indication of the at least one SRS resource indicates the set of precoders and the transmission rank.

13. The apparatus of claim 12, wherein:
the at least one SRS resource comprises a single SRS resource from the one or more SRS resources;
the set of precoders are selected from the single SRS resource; and
the transmission rank is equal to a number of precoded SRS ports in the single SRS resource.

14. The apparatus of claim 12, wherein:
the at least one SRS resource comprises a plurality of SRS resources from the one or more SRS resources;
the set of precoders are selected from the plurality of SRS resources; and
the transmission rank is equal to a number of precoded SRS ports in the plurality of SRS resources.

15. The apparatus of claim 12, wherein each of the one or more SRS resources comprises a single precoded SRS port.

16. The apparatus of claim 12, further comprising:
means for receiving an uplink transmission that is based on at least one of the transmission rank or the set of precoders.

17. The apparatus of claim 12, wherein:
the one or more SRS resources are received on a first set of time and frequency resources;
the indication of the at least one SRS resource is signaled on a second set of time and frequency resources; and
the second set of time and frequency resources are determined in part on the first set of time and frequency resources.

18. An apparatus for wireless communication, comprising:
means for transmitting one or more sounding reference signal (SRS) resources to a base station (BS), wherein each SRS resource is associated with one or more precoded SRS ports;
means for receiving an indication of at least one SRS resource of the one or more SRS resources to use for an uplink transmission after transmitting the one or more SRS resources;
means for determining (i) a set of precoders for the uplink transmission and (ii) a transmission rank, based on the indication of the at least one SRS resource of the one or more SRS resources; and
means for sending an uplink transmission based in part on the set of precoders and the transmission rank.

19. The apparatus of claim 18, wherein:
the at least one SRS resource comprises a single SRS resource;
the set of precoders are determined from the single SRS resource; and
the transmission rank is equal to a number of precoded SRS ports in the single SRS resource.

20. The apparatus of claim 18, wherein:
the at least one SRS resource comprises a plurality of SRS resources;
the set of precoders are determined from the plurality of SRS resources; and
the transmission rank is equal to a number of precoded SRS ports in the plurality of SRS resources.

21. The apparatus of claim 18, wherein each of the one or more SRS resources comprises a single precoded SRS port.

22. The apparatus of claim 18, wherein:
the one or more SRS resources are transmitted to the BS on a first set of time and frequency resources;
the indication of the at least one SRS resource is received on a second set of time and frequency resources; and
the second set of time and frequency resources are determined in part on the first set of time and frequency resources.

23. An apparatus for wireless communication, comprising:
a receiver configured to receive one or more sounding reference signal (SRS) resources from a user equipment (UE), wherein each SRS resource is associated with one or more precoded SRS ports;
at least one processor configured to determine, based on the one or more SRS resources, at least one of a transmission rank or a set of precoders for an uplink transmission;
a transmitter configured to transmit an indication of at least one SRS resource from the one or more SRS resources to the UE, wherein the indication of the at least one SRS resource indicates the set of precoders and the transmission rank; and
a memory coupled to the at least one processor.

24. The apparatus of claim 23, wherein:
the at least one SRS resource comprises a single SRS resource from the one or more SRS resources;
the set of precoders are selected from the single SRS resource; and
the transmission rank is equal to a number of precoded SRS ports in the single SRS resource.

25. The apparatus of claim 23, wherein:
the at least one SRS resource comprises a plurality of SRS resources from the one or more SRS resources;
the set of precoders are selected from the plurality of SRS resources; and
the transmission rank is equal to a number of precoded SRS ports in the plurality of SRS resources.

26. The apparatus of claim 23, wherein each of the one or more SRS resources comprises a single precoded SRS port.

27. The apparatus of claim 23, wherein the receiver is further configured to receive an uplink transmission that is based on at least one of the transmission rank or the set of precoders.

28. The apparatus of claim 23, wherein:
the one or more SRS resources are received on a first set of time and frequency resources;
the indication of the at least one SRS resource is signaled on a second set of time and frequency resources; and
the second set of time and frequency resources are determined in part on the first set of time and frequency resources.

29. An apparatus for wireless communication, comprising:
a transmitter configured to transmit one or more sounding reference signal (SRS) resources to a base station (BS), wherein each SRS resource is associated with one or more precoded SRS ports;
a receiver configured to receive an indication of at least one SRS resource of the one or more SRS resources to use for an uplink transmission after the one or more SRS resources are transmitted;
at least one processor configured to determine (i) a set of precoders for the uplink transmission and (ii) a transmission rank, based on the indication of the at least one SRS resource of the one or more SRS resources, wherein the transmitter is further configured to send an uplink transmission based in part on the set of precoders and the transmission rank; and
a memory coupled to the at least one processor.

30. The apparatus of claim 29, wherein:
the at least one or more SRS resource comprises a single SRS resource;
the set of precoders are determined from the single SRS resource; and
the transmission rank is equal to a number of precoded SRS ports in the single SRS resource.

31. The apparatus of claim 29, wherein:
the at least one SRS resource comprises a plurality of SRS resources;
the set of precoders are determined from the plurality of SRS resources; and
the transmission rank is equal to a number of precoded SRS ports in the plurality of SRS resources.

32. The apparatus of claim 29, wherein each of the one or more SRS resources comprises a single precoded SRS port.

33. The apparatus of claim 29, wherein:
the one or more SRS resources are transmitted to the BS on a first set of time and frequency resources;
the indication of the at least one SRS resource is received on a second set of time and frequency resources; and
the second set of time and frequency resources are determined in part on the first set of time and frequency resources.

34. A computer-readable medium having computer executable code stored thereon for wireless communications by a base station (BS), the computer executable code being executable by one or more processors to perform a method comprising:
receiving one or more sounding reference signal (SRS) resources from a user equipment (UE), wherein each SRS resource is associated with one or more precoded SRS ports;
determining, based on the one or more SRS resources, at least one of a transmission rank or a set of precoders for an uplink transmission; and
signaling an indication of at least one SRS resource from the one or more SRS resources to the UE, wherein the indication of the at least one SRS resource indicates the set of precoders and the transmission rank.

35. The computer-readable medium of claim 34, wherein:
the at least one SRS resource comprises a single SRS resource from the one or more SRS resources;
the set of precoders are selected from the single SRS resource; and
the transmission rank is equal to a number of precoded SRS ports in the single SRS resource.

36. The computer-readable medium of claim 34, wherein:
the at least one SRS resource comprises a plurality of SRS resources from the one or more SRS resources;
the set of precoders are selected from the plurality of SRS resources; and
the transmission rank is equal to a number of precoded SRS ports in the plurality of SRS resources.

37. A computer-readable medium having computer executable code stored thereon for wireless communications by a user equipment (UE), the computer executable code being executable by one or more processors to perform a method comprising:
transmitting one or more sounding reference signal (SRS) resources to a base station (BS), wherein each SRS resource is associated with one or more precoded SRS ports;

receiving an indication of at least one SRS resource of the one or more SRS resources to use for an uplink transmission after transmitting the one or more SRS resources;

determining (i) a set of precoders for the uplink transmission and (ii) a transmission rank, based on the indication of the at least one SRS resource of the one or more SRS resources; and sending an uplink transmission based in part on the set of precoders and the transmission rank.

38. The computer-readable medium of claim 37, wherein:

the at least one SRS resource comprises a single SRS resource;

the set of precoders are determined from the single SRS resource; and the transmission rank is equal to a number of precoded SRS ports in the single SRS resource.

39. The computer-readable medium of claim 37, wherein:

the at least one SRS resource comprises a plurality of SRS resources;

the set of precoders are determined from the plurality of SRS resources; and the transmission rank is equal to a number of precoded SRS ports in the plurality of SRS resources.

40. The computer-readable medium of claim 37, wherein each of the one or more SRS resources comprises a single precoded SRS port.

41. The computer-readable medium of claim 37, wherein:

the one or more SRS resources are transmitted to the BS on a first set of time and frequency resources;

the indication of the at least one SRS resource is received on a second set of time and frequency resources; and the second set of time and frequency resources are determined in part on the first set of time and frequency resources.

* * * * *